Aug. 8, 1939.    I. KAUFMAN    2,169,069
PIPE UNION AND FITTING
Filed March 17, 1938    2 Sheets-Sheet 1
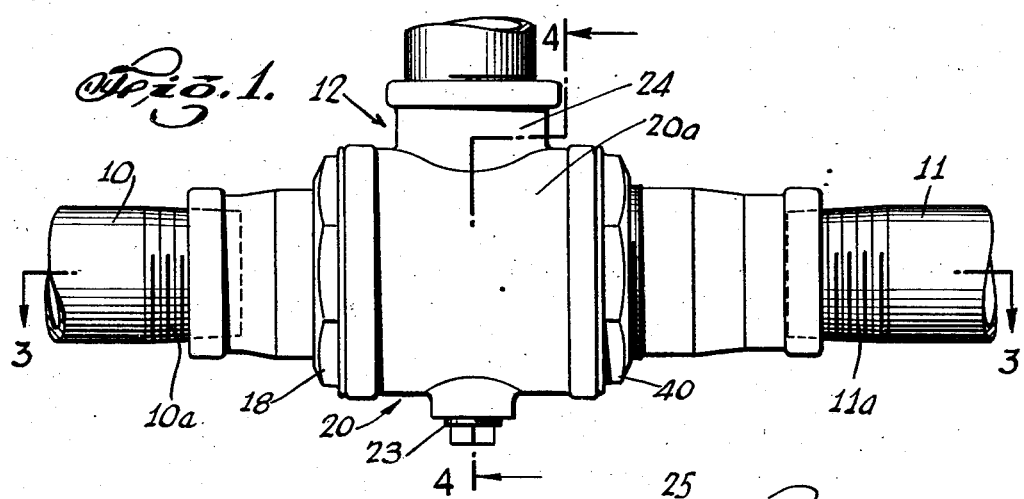
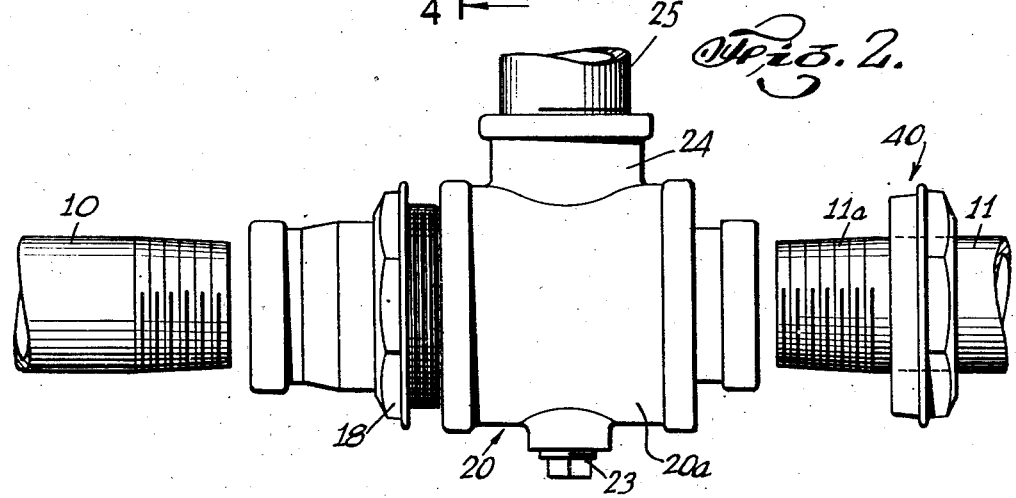
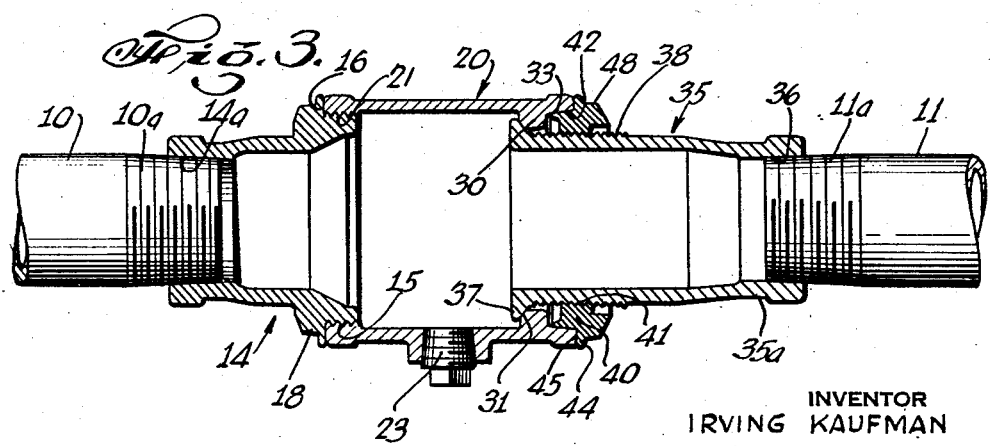
INVENTOR
IRVING KAUFMAN
BY
Carl Miller
ATTORNEY Aug. 8, 1939.  I. KAUFMAN  2,169,069
PIPE UNION AND FITTING
Filed March 17, 1938   2 Sheets-Sheet 2
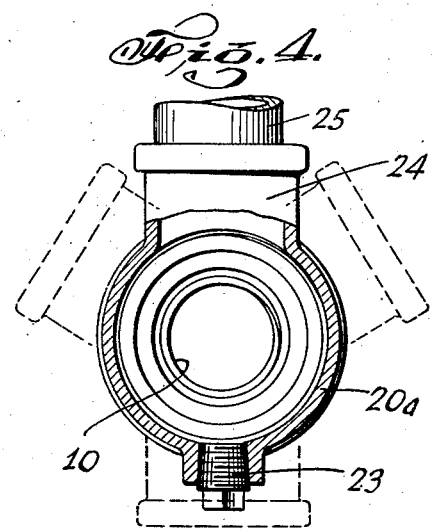
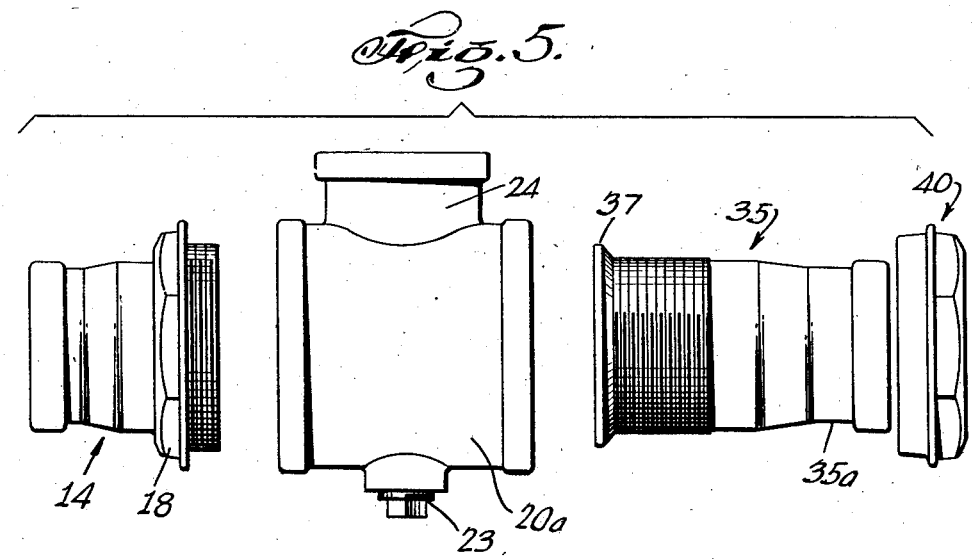
INVENTOR
IRVING KAUFMAN
BY
Carl Miller
ATTORNEY Patented Aug. 8, 1939

2,169,069

UNITED STATES PATENT OFFICE 2,169,069

PIPE UNION AND FITTING

Irving Kaufman, Bronx, N. Y., assignor of one-third to Simon Kaufman and one-third to Thomas W. Bieder, both of Bronx, N. Y.

Application March 17, 1938, Serial No. 196,440

1 Claim. (Cl. 285—13)

This invention relates to pipe unions and fittings.

An object of this invention is to provide a pipe union and fitting or joint of the character described, adapted to be interposed between a pair of coaxial, spaced, opposed, fixed nipples, without the necessity for rotating or moving said nipples.

A further object of this invention is to provide a pipe joint and T-fitting of the character described, so constructed that the T-fitting may be rotated to any desired angular position, relative to the axis of said nipples, and fixed in said angular position against movement.

Another object of this invention is to provide a strong, rugged and durable pipe joint and fitting of the character described, which shall be relatively inexpensive to manufacture, easy to assemble, disassemble and adjust, and which shall yet be practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claim.

In the accompanying drawings, in which is shown one of the various possible illustrative embodiments of this invention, Fig. 1 is a side elevational view of a pipe joint and T-fitting embodying the invention, fixed to a pair of coaxial, opposed nipples;

Fig. 2 is a side elevational view of the structure shown in Fig. 1, illustrating a method of disassembling the joint;

Fig. 3 is a cross-sectional view taken on line 3—3 of Fig. 1;

Fig. 4 is a cross-sectional view taken on line 4—4 of Fig. 1 and showing the T-fitting in various angular positions; and Fig. 5 is a side elevational view of the various parts of my improved pipe joint and T-fitting.

Referring now in detail to the drawings, 10 and 11 designate a pair of axial, spaced opposed, fixed nipples or pipe sections with the threaded portions thereof toward each other; and 12 designates a pipe joint or union and T-fitting embodying the invention and interconnecting said nipples. The nipples 10 and 11 have externally screw threaded portions 10a and 11a spaced from one another.

Screwed to the threaded portion 10a of the nipple 10, is a tubular coupling member 14, having an internally screw threaded portion 14a at one end, engaging the threads 10a. Said coupling 14 is formed with an externally screw threaded portion 15 adjacent the other end. Said member 14 is furthermore formed with an annular shoulder 16 adjacent the externally screw threaded portion 15 thereof; and adjacent said shoulder 16 is a polygonal portion 18, adapted to receive a wrench for rotating said coupling.

Screwed to the coupling 14 is a T-fitting 20, having a tubular portion or sleeve 20a coaxial with the nipples 10, 11. Said tubular portion 20a is screw threaded internally at one end, as at 21, for engaging the threaded portion 15 of coupling 14. The rim edge of portion 20a of the fitting 20 at said threaded end thereof is adapted to contact the shoulder 16. The fitting 20 may be provided with a usual cleanout plug 23, as shown in the drawings, and is formed with a branch 24 to receive a pipe or nipple 25.

Adjacent the opposite end thereof, said portion 20a of fitting 20, is formed with an internal, inwardly extending annular flange 30, having an inclined surface 31 on the inner side thereof. Beyond said flange 30, said fitting is formed with an annular outwardly flaring or tapering surface 33 for the purpose hereinafter appearing.

Passing through the flange 30 is a coupling 35, coaxial with the nipples 10, 11, and reduced in external diameter at one end thereof, as at 35a, and formed with an internally screw threaded portion 36 at said end, engaging the threaded portion 11a of the nipples 11. Said coupling 35 is formed at the opposite end thereof, with an outwardly extending bead or flange 37, at one end, disposed within the T-fitting 20, and engaging the inclined surface 31 of the flange 30. Said coupling 35 is furthermore formed with an externally screw threaded portion 38 adjacent said bead 37 of somewhat larger diameter than the reduced end portion 35a of said coupling.

Screwed on said threaded portion 38 is a packing ring 40 having an internally screw threaded portion 41 engaging the threads of said threaded portion; and an external conical surface 42, adapted to engage the internal conical or tapered surface 33 of the fitting 20. Adjacent said surface 42 is a shoulder 44, adapted to contact one end edge 45 of the fitting 20. The ring 40 is furthermore formed with an external polygonal portion 48 adapted to receive a wrench for turning said ring.

Upon screwing said packing ring toward the bead 37, said bead will be firmly pressed against the inclined surface 31 of the flange 30. Upon unscrewing the packing ring 40 from the threaded portion 38, the same may be slipped off the reduced end 35a of the coupling 35. The fitting 20 may then be rotated about the axis of the nipples 10 and 11 to any desired angular position, upon loosening ring 40, and the ring may then again be tightened to hold the fitting in any angular position to which the same has been rotated.

The pipe joint and T-fitting may be disassembled from the nipples 10 and 11 by first unscrewing the ring 40 and moving the same to the position shown in Fig. 2 of the drawings. The coupling member 35 may then be unscrewed from the nipple 11 and moved axially into the fitting 20. The fitting 20 may then be unscrewed from the coupling 14 and removed therefrom, together with the coupling member 35. The coupling member 35 may then be removed from the fitting by passing the same through the screw threaded opening 21 of said fitting. The external diameter of the bead 37 is less than the internal diameter of said screw threaded portion 21, to permit removal of said coupling from fitting 20. The coupling member 14 may then be unscrewed from the nipple 10 and the ring 40 slipped off the nipple 11.

To assemble the pipe joint, the above steps are reversed. The coupling member 14 is first screwed on the nipple 10. The ring 40 is slipped over the nipple 11. The coupling 35 is passed through the fitting 20 and said fitting is then screwed into the coupling 14, and coupling 35 screwed to the nipple 11. Ring 40 is then screwed into the threaded portion 38 of said coupling to fix the parts against movement.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

A coupling for two pipe sections comprising a sleeve having an inwardly directed flange at one end thereof and an internal tapered recess exteriorly of the flange, internal threads at the other end of the sleeve, an externally threaded coupling member having a flange at one end thereof adapted to be inserted through the threaded end of the sleeve for seating the flange of the coupling member against the flange of the sleeve, and a coupling nut having a tapered exterior surface engaging the threads of the coupling member and wedgingly engaging the tapered surface of said sleeve.

IRVING KAUFMAN.